(12) United States Patent
Heuer et al.

(10) Patent No.: US 10,040,570 B2
(45) Date of Patent: Aug. 7, 2018

(54) SENSING ORIFICE FOR AN AIRCRAFT

(71) Applicant: Airbus Defence and Space GmbH, Munich (Ottobrunn) (DE)

(72) Inventors: Thomas Heuer, Allerhausen (DE); Horst Altmann, Munich (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 335 days.

(21) Appl. No.: 14/796,072

(22) Filed: Jul. 10, 2015

(65) Prior Publication Data
US 2016/0046384 A1    Feb. 18, 2016

(30) Foreign Application Priority Data

Jul. 11, 2014    (DE) .................... 10 2014 010 293

(51) Int. Cl.

| | |
|---|---|
| *G01L 19/06* | (2006.01) |
| *B64D 43/00* | (2006.01) |
| *G01P 5/14* | (2006.01) |
| *G01P 5/165* | (2006.01) |
| *B64C 1/12* | (2006.01) |
| *G01F 1/42* | (2006.01) |
| *B64F 5/10* | (2017.01) |

(52) U.S. Cl.
CPC ............ *B64D 43/00* (2013.01); *B64C 1/12* (2013.01); *B64F 5/10* (2017.01); *G01F 1/42* (2013.01); *G01P 5/14* (2013.01); *G01P 5/165* (2013.01)

(58) Field of Classification Search
CPC ................................................ G01L 19/0654
See application file for complete search history.

(56) References Cited

U.S. PATENT DOCUMENTS 9,080,903 B2 *  7/2015  Ashton ............... G01P 5/165

FOREIGN PATENT DOCUMENTS

| DE | 690 17 897 T2 | 7/1995 |
|---|---|---|
| EP | 0 462 227 B1 | 3/1995 |
| WO | WO 2013/028220 A1 | 2/2013 |
| WO | WO 2015/095183 A1 | 6/2015 |

OTHER PUBLICATIONS

European Search Report issued in European counterpart application No. 15 00 2054 dated Nov. 10, 2015, with Statement of Relevancy (Two (2) pages).

* cited by examiner

*Primary Examiner* — Robert R Raevis
(74) *Attorney, Agent, or Firm* — Crowell & Moring LLP

(57) ABSTRACT

A sensing orifice for an aircraft, an aircraft with such a sensing orifice and a method for assembling a sensing orifice for an aircraft are provided. The aircraft may be an airplane, a helicopter, a UAV, a drone or similar. The static sensing orifice includes a passage through an outer skin of the aircraft and a moisture protection body. The passage is designed to connect with a pressure line in the interior of the aircraft. The moisture protection body is gas-permeable and water-impermeable, and the moisture protection body is disposed such that the passage is gas-permeably and water-impermeably sealed. The method for assembling the static sensing orifice for the aircraft, includes the following steps: providing the passage through the outer skin of the aircraft for connecting to the pressure line in the interior of the aircraft, providing a gas-permeable and water-impermeable moisture protection body, and gas-permeable and water-impermeable sealing of the passage by the moisture protection body.

8 Claims, 5 Drawing Sheets

SENSING ORIFICE FOR AN AIRCRAFT

CROSS-REFERENCE TO RELATED APPLICATION

This application claims priority under 35 U.S.C. § 119 from German Patent Application No. 10 2014 010 293.9, filed Jul. 11, 2014, the entire disclosure of which is herein expressly incorporated by reference.

TECHNICAL FIELD

The invention relates to a sensing orifice for an aircraft, in particular a static sensing orifice for an aircraft, an aircraft with such a sensing orifice and a method for assembling a sensing orifice for an aircraft. The aircraft may be an airplane, a helicopter, a UAV (Unmanned Aerial Vehicle), a drone or similar.

BACKGROUND OF THE INVENTION

Static sensing orifices and associated pressure transmitters and lines must be protected against the ingress and accumulation of water and moisture in order to ensure, inter alia, disruption-free operation of an air data system, i.e. a data source for flight control and flight guidance. The sensing orifices are usually disposed in the region of an outer skin of an aircraft fuselage. Typically, the sensing orifices are combined with water separators or water traps, which are disposed in the lines in order to separate and collect the water. However, these water separators are expensive to integrate into the aircraft, in inspection, in operation, in maintenance and in repair. In addition, water separators require corresponding maintenance flaps or doors for inspection, operation, maintenance and repair, which however significantly reduce the cloaking and stealth characteristics of the aircraft. Furthermore, their ability to function depends on gravity, which means that they only work properly in normal flight. Inverted flight, and in particular a sustained inverted flight, poses a problem.

SUMMARY OF THE INVENTION

It is an object of the invention to provide a sensing orifice for an aircraft which is particularly easy to handle. This object is achieved by means of a sensing orifice for an aircraft, an aircraft with such a sensing orifice and a method for assembling a sensing orifice for an aircraft according to embodiments of the invention.

Proposed is to provide a sensing orifice and, in particular, a static sensing orifice for an aircraft. The aircraft may be an airplane, a helicopter, a UAV, a drone or similar. In the following, an airplane will be assumed. The sensing orifice comprises a passage through an outer skin of an airplane and a moisture protection body. The passage is designed for connection with a pressure line inside the aircraft and may be a hole drilled through the outer skin. The pressure line can be of any shape and length, and can lead, for example, to one or more instruments, pressure transmitters or pressure transducers.

The moisture protection body is gas-permeable and water-impermeable, and the moisture protection body is disposed such that the passage is gas-permeably and water-impermeably sealed.

A material can be considered water-impermeable if it prevents the penetration of liquid water under a pressure of at least 1.5 bar (1500 mm water column). A material can be considered gas-permeable if it allows a flow rate of at least 0.005 cm$^3$/s across the entire cross-section of the passage at a pressure differential of 1 mbar and an external pressure of about 1 bar. In the case of higher accuracy requirements of the pressure measurements, a greater internal volume of a possibly closed pressure transmitter, higher climb and sink rates of the airplane and/or similar conditions, the requirements may increase by one to two orders of magnitude. For example, a material can also be considered water-impermeable if it prevents a penetration of liquid water under a pressure between 0.5 bar and 15 bar, and preferably between 0.1 bar and 150 bar. For example, a material can also be considered gas-permeable if it allows a flow rate of at least 0.0001 cm$^3$/s or at least 0.01 cm$^3$/s across the entire cross-section of the passage at a pressure differential of 1 mbar and an external pressure of about 1 bar.

By means of example and in other words, the static sensing orifice of the invention is protected against ingress of water and moisture without obstructing the airflow through the sensing orifice. A pressure equalization thus remains possible.

According to the invention, the expense related to inspection, operation, maintenance and repair of the sensing orifice is significantly reduced in contrast to the use of conventional water separators or water traps. Unlike conventional water separators, the functionality of the static sensing orifice is not dependent on gravity, so that even a prolonged inverted flight of the aircraft does not pose a problem. The static sensing orifice and its surrounding region on the outer skin of the airplane can be adapted to the surface characteristics of the outer skin such that no disturbance of a pressure measurement by a pressure sensor and no disturbance of the airflow along the airplane occur through the static sensing orifice. Furthermore, the use of service flaps or doors, which can negatively influence the cloaking or stealth characteristics of the airplane, is avoided. Also prevented is the penetration of foreign substances such as dust and insects into the pressure lines inside the airplane. Overall, the practicability of the sensing orifice is improved.

The moisture protection body may be porous or microporous. By porous, any material having permeable pores or a pore structure in a size relevant for gas exchange can be understood. These pores are preferably just large enough to ensure a gas exchange, but to prevent passage of liquid water. The gas exchange is necessary in order to ensure a pressure equalization between the changing ambient pressure and the pressure within the sensing orifice, the pressure line and/or a pressure transmitter or pressure transducer. This may be a pore size larger than about 0.1 µm. In one embodiment, the pore size of the porous moisture protection body is between about 0.05 µm and 0.75 µm, preferably between about 0.1 µm and 0.5 µm and more preferably between about 0.2 µm and 0.4 µm. The demands on the properties of the moisture protection body depend, inter alia, on the cross-section of the passage, the dead air volume, the maximum expected vertical speed and the maximum allowable error of the pressure measurement.

In one embodiment, the moisture protection body comprises a membrane. The membrane may comprise a fabric. The membrane may be a laminate. The membrane may be a composite of several layers, such as a membrane layer, a backing layer and/or a protective layer. The membrane layer can be made of mechanically expanded polytetrafluoroethylene (PTFE, trade name Teflon), polyether or the like. The protective layer serves to protect the membrane against external influences such as mechanical damage or contamination. The protective layer can, for example, be made of polyamide or polyester fabric. The backing layer and the protective layer may be integrated in one layer.

The membrane can thereby be disposed on the outer skin of the airplane such that a coverage area over and around the passage is gas-permeably and water-impermeably sealed. The coverage area over and around the passage is preferably dimensioned such that the edge of the membrane is sufficiently far away from the passage, so as to avoid a disruption of a pressure measurement.

The membrane may be adhered to the outer skin of the aircraft. Also possible is a mechanical fixing of the membrane, such as through clamping in a clamping frame, a fixing screw with a cover plate or the like. The membrane is not provided with adhesives, coatings or other additional additives over the passage, so as not to disrupt the functionality of the membrane.

In one embodiment, an edge of the membrane is tapered to transition to the outer skin. A sealant such as silicone may also be applied to the edge of the membrane at the transition to the outer skin, so that the transition to the outer skin is tapered. The taper reduces disturbance of the pressure measurement.

In one embodiment, the moisture protection body is an insert which is inserted into the passage of the airplane. The insert can hereby have a conical shape. The insert may be a kind of stopper or cork from a suitable air-permeable, water-impermeable material. The insert can be disposed flush with an upper surface of the outer skin. In this way, edges and steps are avoided, which may interfere with a pressure measurement by a pressure sensor or with an airflow along the aircraft.

The insert may be fixed by use of a fixing device on an inner side of the airplane. The fixing device may be designed for connection to the pressure line and further to the sealing connection with the pressure line.

In one embodiment, the sensing orifice further comprises a pressure line and heating device. The pressure line can be connected to the passage. The pressure line may be heated by the heating device. The sensing orifice can further comprise a pressure transmitter or pressure transducer which is connected with the pressure line and can be heated by way of the heating device. The heating device can prevent undesired cooling or freezing of the devices. The heating device may further help to remove moisture by means of accelerated diffusion. The passage, the outer skin of the airplane and/or the moisture protection body are preferably not heatable, in order to avoid damage to these components.

Proposed is to provide an airplane with such a sensing orifice. The aircraft may be an airplane, a helicopter, a UAV, a drone or similar.

It is further proposed to provide a method for assembling a sensing orifice for an aircraft. The method for assembling an in particular static sensing orifice for an aircraft comprises the following steps, not necessarily in this order:
  a) providing a passage through an outer skin of an aircraft for connecting to a pressure line in the interior of the aircraft;
  b) providing a gas-permeable and water-impermeable moisture protection body; and
  c) gas-permeable and water-impermeable sealing of the passage by use of the moisture protection body.

The moisture protection body may be porous or microporous. In one embodiment, the moisture protection body comprises a membrane. Step c) may then comprise disposing the membrane on the outer skin of the aircraft such that a coverage area over and around the passage is gas-permeably and water-impermeably sealed and covered.

In one exemplary embodiment, the moisture protection body is an insert which is inserted into the passage of the airplane. The insert can hereby have a conical shape. The insert may be fixed by use of a fixing device on an inner side of the airplane. Step c) may then comprise disposing the insert in the passage of the airplane such that the passage is gas-permeably and water-impermeably sealed. Step c) may further comprise a fixing of the insert by the fixing device on the inner side of the airplane or the outer skin.

In one embodiment, the sensing orifice further comprises a pressure line, a pressure transmitter and/or a heating device. The method for assembling a sealing orifice for an aircraft may then further comprise a step d), namely a connection of the passage with the pressure line, the pressure transmitter and/or the heating device.

Finishing work on the outer skin is preferably undertaken after the assembly of the moisture protection body, in order to avoid damage to the moisture protection body and the formation of disruptive edges and steps.

Other objects, advantages and novel features of the present invention will become apparent from the following detailed description of one or more preferred embodiments when considered in conjunction with the accompanying drawings.

BRIEF DESCRIPTION OF THE DRAWINGS

In the figures, like reference characters represent the same or similar objects.

DETAILED DESCRIPTION OF EXEMPLARY EMBODIMENTS

Figure 1:
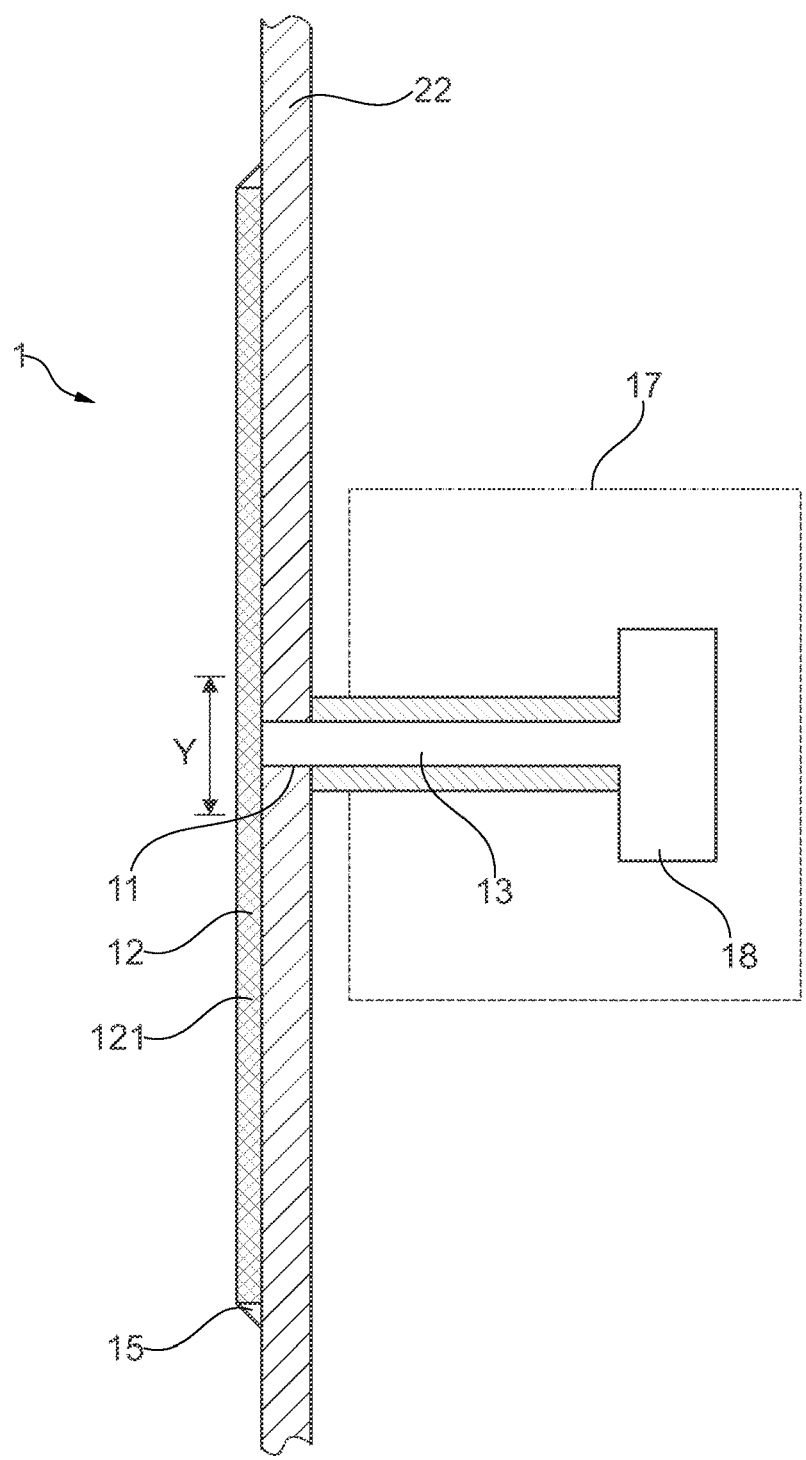
FIG. 1 shows a cross-sectional view of an outer skin of an aircraft and a static sensing orifice in accordance with an embodiment of the present invention.

FIG. 1 shows a cross-section through an outer skin 22 of an aircraft 100 and a static sensing orifice 1 which is integrated in the outer skin 22. The aircraft 100 may be an airplane, a helicopter, a UAV, a drone or similar. In the following, an airplane will be assumed. The sensing orifice 1 comprises a passage 11 through the outer skin 22 of the airplane and a moisture protection body 12.

The passage 11 is a hole drilled through the outer skin 22 and connected with a pressure line 13 in the interior of the airplane. The pressure line 13 is of any desired shape and length, and is connected here with a pressure transmitter 18 or pressure transducer.

The moisture protection body 12 is porous, gas-permeable and water-impermeable. As a porous material, any material can be used having permeable pores or a pore structure in a size relevant for gas exchange. These pores are preferably just large enough to ensure a gas exchange, but to prevent passage of liquid water. The gas exchange is necessary in order to ensure a pressure equalization between the changing ambient pressure and the pressure within the sensing orifice 1, the pressure line 13 and the pressure transmitter 18 or pressure transducer.

The moisture protection body 12 is disposed such that the passage 11 is gas-permeably and water-impermeably sealed, in that the moisture protection body 12 covers the passage 11. The static sensing orifice 1 is thus protected against the ingress of water and moisture, without restricting the airflow through the sensing orifice 1. A pressure equalization thus remains possible.

Figure 2:
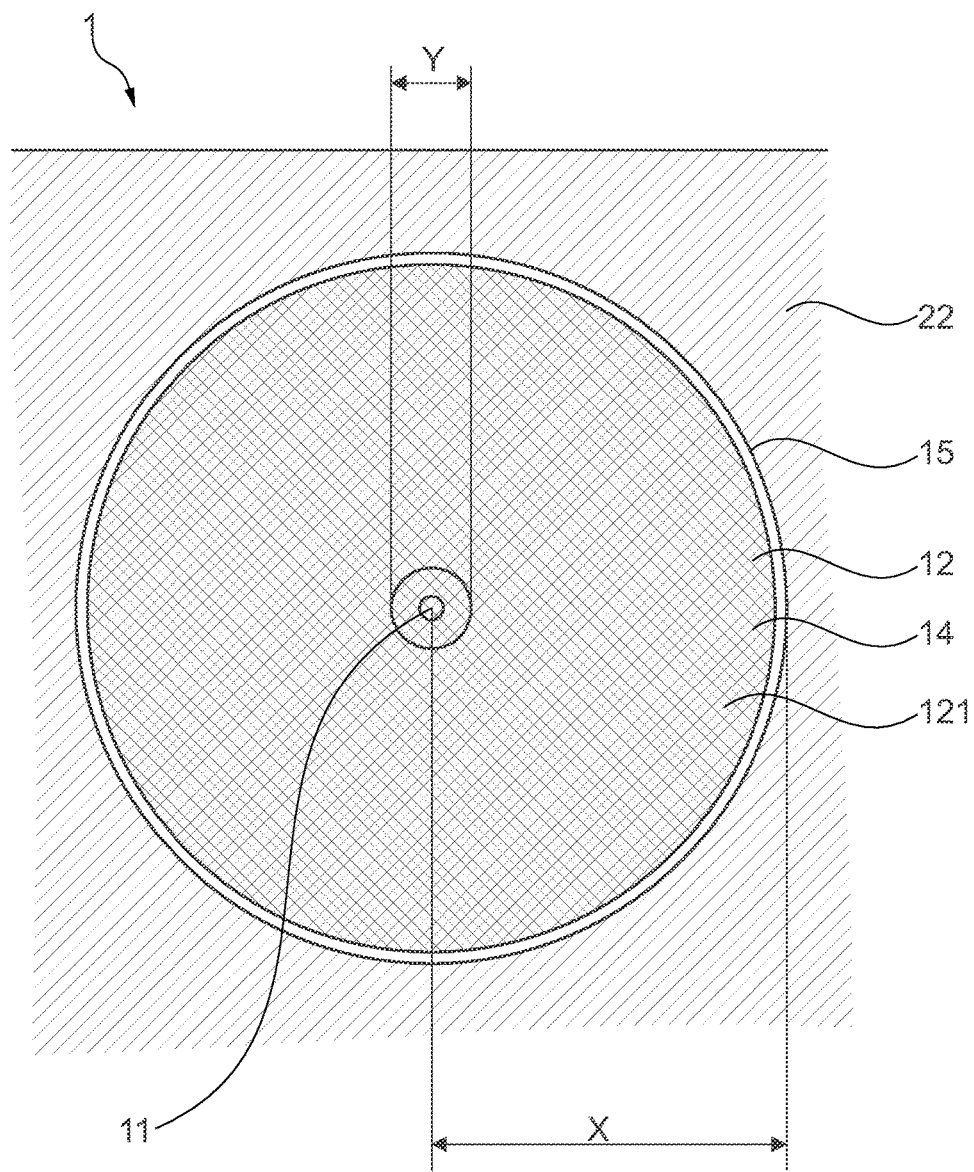
FIG. 2 shows a top view of the outer skin of the aircraft and the static sensing orifice in accordance with an embodiment of the present invention.

In the embodiment shown in FIGS. 1 and 2, the moisture protection body 12 comprises a membrane 121. The membrane 121 is here a composite of a backing and protective layer and a membrane layer. The backing and protective layer serve to mechanically support and protect the membrane layer from external influences such as mechanical damage or contamination. FIG. 2 shows a top view of the outer skin 22 of the aircraft 100 and the static sensing orifice 1 which is integrated in the outer skin 22. The membrane 121 is circular in the top view, but may also have other shapes. The membrane 121 is disposed on the outer skin 22 of the airplane such that a coverage area 14 over and around the passage 11 is gas-permeably and water-impermeably sealed. The coverage area 14 over and around the passage 11 is dimensioned such that the edge of the membrane 121 is sufficiently far away from the passage 11, here by an amount x, so as to avoid a disruption of a pressure measurement.

The membrane 121 is adhered to the outer skin 22 of the aircraft. The membrane 121 is not provided with adhesives, coatings or other additional additives over the passage 11 in a region y, so as not to disrupt the functionality of the membrane 121.

A sealant 15 is applied to the edge of the membrane 121 at the transition to the outer skin 22, so that the transition to the outer skin 22 is tapered. The taper reduces disturbance of the pressure measurement and the flow of air.

Figure 3:
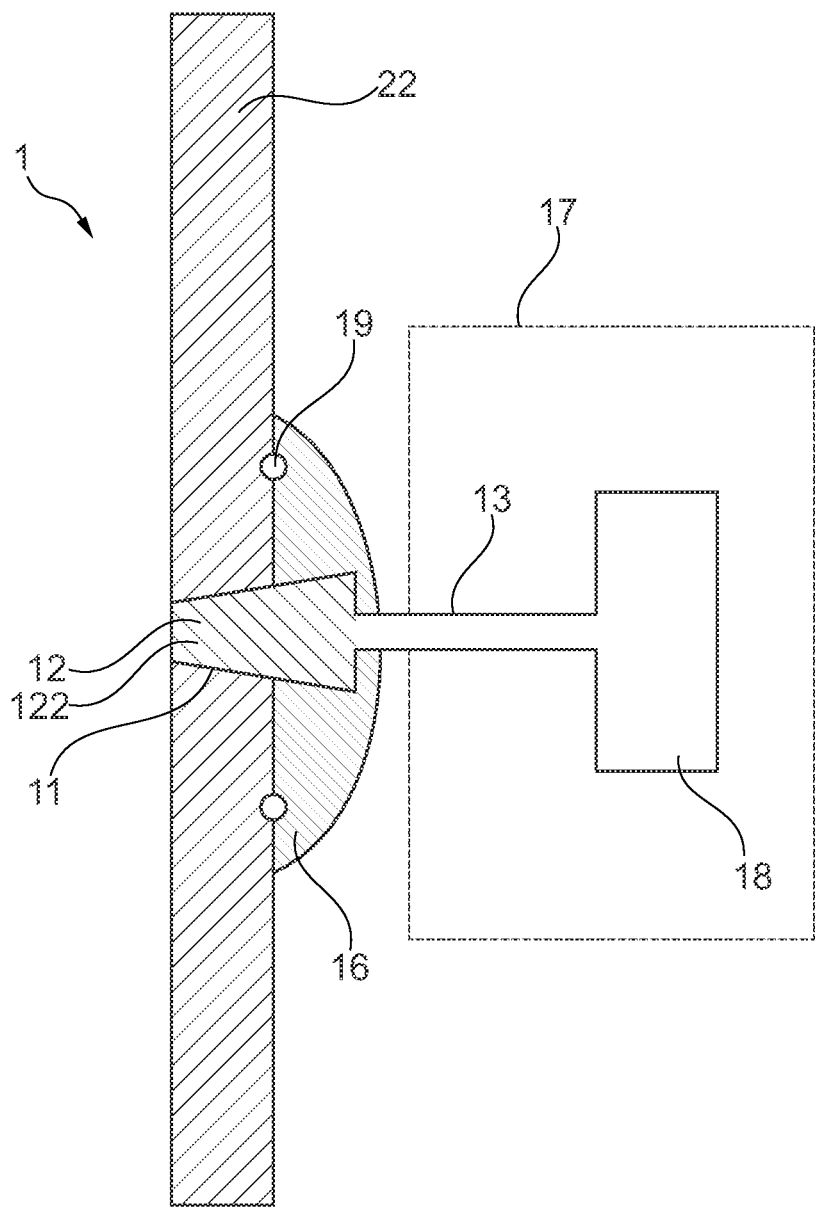
FIG. 3 shows a cross-sectional view of an outer skin of an aircraft and a static sensing orifice in accordance with a further embodiment of the present invention.

FIG. 3 shows a cross-section through an outer skin 22 of an aircraft 100 and another embodiment of the static sensing orifice 1. As in FIGS. 1 and 2, the sensing orifice 1 comprises a passage 11 through the outer skin 22 of the airplane and a porous moisture protection body 12. The moisture protection body 12 is disposed such that the passage 11 is gas-permeably and water-impermeably sealed, in that the moisture protection body 12 obstructs the passage 11.

In this embodiment, the moisture protection body 12 is an insert 122, which is inserted in the passage 11 of the airplane in order to gas-permeably and water-impermeably seal the passage 11. The insert 122 thereby has a conical shape and is a kind of stopper. The insert 122 is positioned flush with the upper surface of the outer skin 22, so that edges and steps, which may interfere with a pressure measurement by a sensing orifice or a flow of air along the airplane, are avoided.

The insert 122 is fixed by use of a fixing device 16 on an inner side of the outer skin 22. The fixing device 16 also serves to sealingly connect the insert 122 with the pressure line 13. A sealing ring 19 may seal the passage 11 against the airplane interior.

In the embodiments shown in FIGS. 1 and 3, the sensing orifice 1 further comprises the pressure line 13 and a heating device 17. The pressure line 13 is connected with the passage 11 and heated by the heating device 17. The pressure line 13 may be insulated by a sheathing. The sensing orifice 1 further comprises the pressure transmitter 18 or pressure transducer, which is connected with the pressure line 13 and is likewise heatable by way of the heating device 17. The heating device 17 can prevent undesired cooling of freezing of the devices. The heating device 17 may further help to remove moisture by means of accelerated diffusion. The passage 11, the outer skin of the airplane and/or the moisture protection body 12 are preferably not heatable, in order to avoid damaging these components and/or worsening the stealth characteristics of the airplane.

Figure 4:
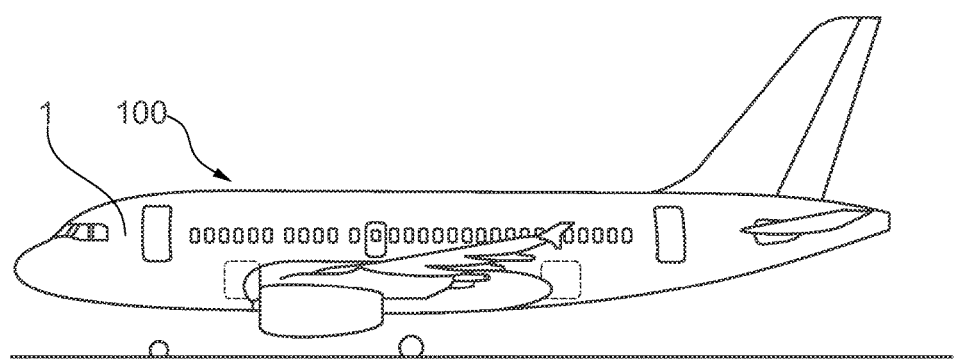
FIG. 4 shows an airplane with a sensing orifice in accordance with an embodiment of the present invention.
Figure 5:
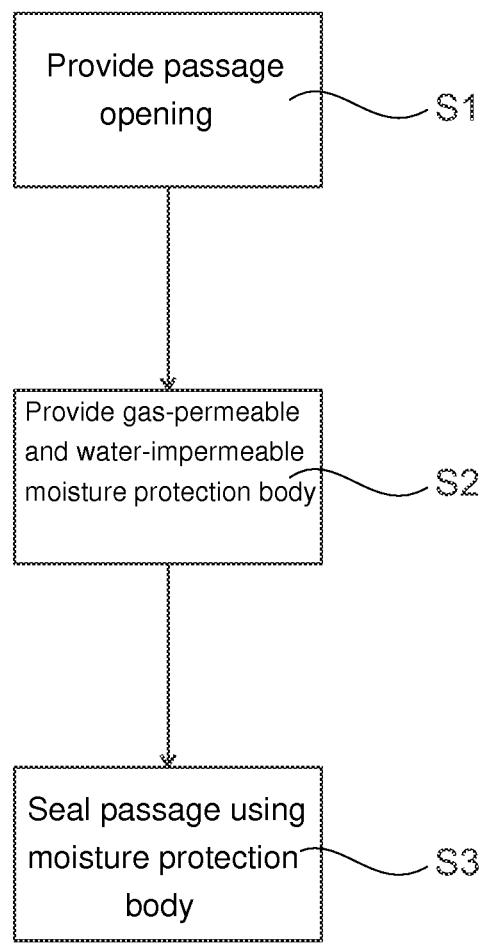
FIG. 5 shows a schematic representation of a method for assembling a sensing orifice on an aircraft according to an embodiment of the present invention.

FIG. 4 shows an aircraft 100, namely an airplane, with a sensing orifice 1 according to the invention and FIG. 5 is a schematic representation of a method for assembling a sensing orifice 1 on an airplane. The method for assembling a static sensing orifice 1 on an airplane comprises the following steps, not necessarily in this order:

a) providing a passage 11 through an outer skin 22 of an aircraft 100 for connecting to a pressure line 13 in the interior of the aircraft 100 (S1);

b) providing a gas-permeable and water-impermeable moisture protection body 12 (S2); and c) gas-permeable and water-impermeable sealing of the passage 11 by use of the moisture protection body 12 (S3).

In one embodiment, the moisture protection body 12 comprises the membrane 121. Step S3 may then comprise disposing the membrane 121 on the outer skin 22 of the aircraft 100 such that a coverage area 14 over and around the passage 1 is gas-permeably and water-impermeably sealed and covered.

In one embodiment, the moisture protection body 12 is a conical insert 122 which is inserted in the passage 1 of the airplane 100. The insert 122 can be fixed by use of a fixing device 16 on an inner side of the airplane 100 or the outer skin 22. The step S3 may then comprise disposing the insert 122 in the passage 1 of the airplane 100 such that the passage 1 is gas-permeably and water-impermeably sealed, and possible fixing of the insert 122 by use of the fixing device 16 on the inner side of the airplane 100 or the outer skin 22.

In one embodiment, the sensing orifice 1 further comprises a pressure line 13, a pressure transmitter 18 and/or a heating device. The method for assembling a sealing orifice 1 for an aircraft 100 may then further comprise a step S4, namely a connection of the passage 1 with the pressure line 13, the pressure transmitter 18 and/or the heating device 17.

Finishing work on the outer skin 22 is preferably undertaken after the assembly of the moisture protection body 12, in order to avoid damage to the moisture protection body 12 and the formation of disruptive edges and steps.

In addition, it should be noted that "comprising" does not exclude other elements or steps and "a" or "one" does not exclude a plurality. It should further be noted that features or steps which have been described with reference to one of the above embodiments may also be used in combination with other features or steps of other exemplary embodiments described above. Reference characters in the claims should not be construed as limiting.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An aircraft, comprising:
    a pressure port comprising
        a passage through an outer skin of the aircraft; and
        a moisture protection body,
    wherein the passage is configured to connect with a pressure line in an interior of the aircraft, the moisture protection body is gas-permeable and water-impermeable, the moisture protection body is disposed so that the passage is gas-permeably and water-impermeably sealed; and wherein the moisture protection body comprises a membrane disposed on the outer skin of the aircraft such that a coverage area over and around the passage is gas-permeably and water-impermeably sealed.

2. The aircraft according to claim 1, wherein the moisture protection body is porous.

3. The aircraft according to claim 1, wherein a sealant is applied to an edge of the membrane at the transition to the outer skin such that the transition to the outer skin is tapered.

4. The aircraft according to claim 3, wherein the moisture protection body further comprises a protective layer for protecting the membrane against external influences.

5. The aircraft according to claim 1, wherein the moisture protection body further comprises a protective layer for protecting the membrane against external influences.

6. The aircraft according to claim 1, wherein the pressure port further comprises a pressure line and a heating device, wherein the passage is connected with the pressure line, and the pressure line is heatable by the heating device.

7. A method for assembling a pressure port for an aircraft, the method comprising the acts of:

providing a passage through an outer skin of an aircraft such that the passage is connectable to a pressure line in an interior of the aircraft;

providing a gas-permeable and water-impermeable moisture protection body; and gas-permeably and water-impermeably sealing the passage by use of the moisture protection body, wherein the moisture protection body comprises a membrane which is disposed on the outer skin of the aircraft such that a coverage area over and around the passage is gas-permeably and water-impermeably sealed.

8. The method according to claim 7, further comprising the act of:

connecting the passage provided with the gas-permeable and water-impermeable moisture protection body sealing the passage to the pressure line, a pressure transmitter, and/or a heater.

* * * * *